Oct. 18, 1938.   L. C. BRISSON   2,133,533
AUTOMATIC HEAT COMPENSATED SLACK ADJUSTING DEVICE
Filed Feb. 15, 1936   2 Sheets-Sheet 1

INVENTOR:
LOUIS CHARLES BRISSON
BY Haseltine Lake & Co.
ATTORNEYS

Oct. 18, 1938.  L. C. BRISSON  2,133,533
AUTOMATIC HEAT COMPENSATED SLACK ADJUSTING DEVICE
Filed Feb. 15, 1936  2 Sheets-Sheet 2
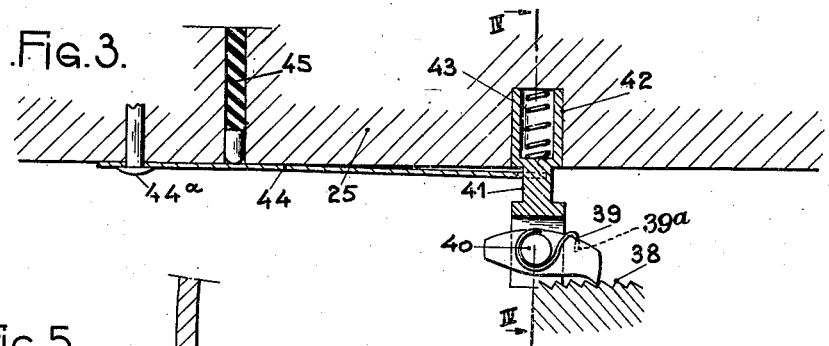
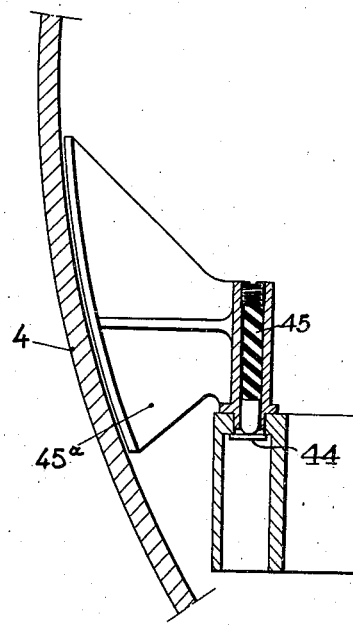
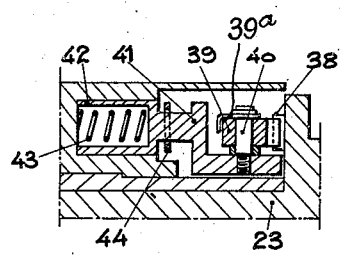
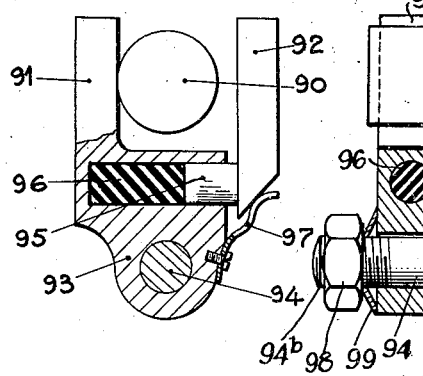
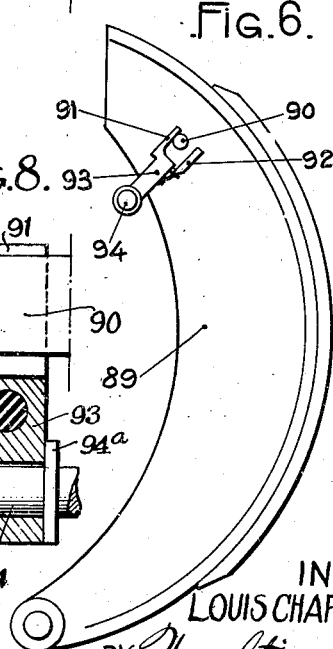
INVENTOR:
LOUIS CHARLES BRISSON
BY Haseltine Lake & Co.
ATTORNEYS Patented Oct. 18, 1938

2,133,533

UNITED STATES PATENT OFFICE 2,133,533

AUTOMATIC HEAT-COMPENSATED SLACK-ADJUSTING DEVICE

Louis Charles Brisson, Neuilly-sur-Seine, France, assignor to Societe des Freins Hydrauliques S. De Lavaud, Paris, France Application February 15, 1936, Serial No. 64,071
In France August 8, 1935

9 Claims. (Cl. 188—79.5)

This invention relates to automatic means for taking up or adjusting the slack in machine parts, and more particularly in braking means for revolving machine parts, as, for example, for the wheels of automotive or other vehicles.

The principal object of this invention is to provide means for automatically adjusting the slack in machine parts under the conditions of fluctuating temperature obtaining in practical operation, in order to maintain said slack within certain preestablished limits.

A further object of said invention is to provide such slack-adjusting means which are continually available at any and all moments, regardless of the temperature of said machine parts, to take up the slack as soon as it exceeds certain pre-established values dependent on the temperature of said machine parts.

A still further object is to provide an improved type of slack-adjusting means which comprises compensating means for automatically neutralizing the influence of transient dimensional changes due to heat, and leaving said slack-adjusting means exposed solely to the action of slowly-progressive dimensional changes due to the wear of the brake parts or the compression of the packing.

A still further object is to provide such compensated slack-adjusting means which are continually available at any and all moments to take up the slack as soon as it exceeds certain pre-established values and automatically add to the maximum allowable permanent slack necessary to bring said slack-adjusting means into operation a variable increment dependent on the temperature of the machine parts and substantially equal to the transient dimensional change in said parts due to heat.

The following explanations refer specifically to brakes for automotive vehicles, and are given to enable the reader to form a clear idea of the technical problems which this invention has solved. However, emphasis is laid on the fact that the invention is by no means limited in its application to automotive vehicles, and that similar problems in all varieties of revolving machinery may be solved by the same means.

Braking devices for revolving machine parts, as, for example, for automotive or other vehicles, are usually subjected during their periods of operation to considerable rises in temperature resulting from the dissipation of mechanical energy, which temperature changes cause the brake drum, or its equivalent, to expand. Said expansion produces certain troubles which differ in their reactions, depending on whether said brake is or is not equipped with slack-adjusting means, said troubles being materially less important in the latter than in the former case.

For example, in a brake which does not comprise slack-adjusting means, the expansion of the drum produced by a rise in temperature adds momentarily to the existing slack, so that the maximum allowable limit may be exceeded. The result is a marked decrease in braking efficiency. This effect is the more detrimental, the greater the initial value of the permanent slack and the nearer said value approaches the maximum allowable limit. On the contrary, if the brake slack has just been adjusted, the initial slack is small, and the effect of heat expansion on the operation of the brake may be practically negligible. It may therefore be said that, in a brake which is not equipped with a slack-adjusting device, the troubles resulting from heat expansion depend closely on the accuracy of the initial setting of the brake when the latter is cold.

On the contrary, in brakes equipped with an automatic slack-adjusting device, the expansion of the drum due to heat produces results which are the more detrimental, the more accurate has been the initial adjustment of said brake when it was cold. The problem of setting a brake consists in adjusting the slack to the minimum value when the brake is cold. Therefore when the drum expands by heat to a sufficient extent to bring the automatic slack-adjusting mechanism into operation, the closer was the initial setting, the sooner the drum, in contracting, will tighten down on the brake shoes and block the wheels of the vehicle.

In order to avoid the above-mentioned defects, both in brakes equipped or not equipped with such automatic slack-adjusting devices, the applicant has previously proposed to make use of a thermostatically-controlled regulating device to automatically increase the spacing of the brake shoes as the temperature of the brake parts rises, and to reduce said spacing when the temperature falls.

Such a device might have been expected to give entire satisfaction. However, in practice, considerable trouble has been encountered which can, in reality, be overcome by extreme precision in the setting of the thermostatic regulator, but which make the device practically inapplicable in the mass-production automotive industries; for any device which is so delicate in its operation as to require careful adjustment on each individual vehicle is evidently not adapted to these industries. The reason for the troubles encountered lies in the fact that the thermostat, which is stationary, cannot be connected directly with the drum, which revolves, and is therefore connected to the brake shoes, on the assumption that the latters' temperature changes follow sufficiently closely those of the drum. Hence the proper functioning of the device depends on the relative heating and cooling rates of the brake drum on the one hand, and the brake shoes and other internal brake organs on the other hand, which rates in reality invariably differ considerably. For example, the drum heats up more rapidly than the shoes. Therefore, in order to prevent the slack-adjusting mechanism from coming prematurely into action under the influence of the expansion of the drum, the thermostat, which is controlled by the temperature of the brake shoes, must be designed to take up an amount of slack materially larger than that which would normally correspond to the temperature of the brake shoes, in order to approach the conditions of the brake drum. But as the drum cools down more rapidly than the brake shoes, the former tends to tighten down on the latter and so to continue the braking action until the thermostat has had time to contract. This defect may be overcome to a considerable extent, but only by such extreme precision of adjustment as to be incompatible with mass production. Said defect therefore appears to bar this improvement from these industries.

In order to solve the technical problem of avoiding the blocking of the brakes equipped with slack-adjusting devices, it has already been proposed to combine said adjusting mechanism with thermostatically-controlled devices of various types designed to put the slack-adjusting mechanism out of service as soon as the temperature of the brake parts exceeds a pre-established limit. But these latter devices present the disadvantage that the adjustment of the slack is suspended whenever the brake parts are hot. It is true that the high-temperature periods are usually of short duration, and that the slack-adjustment is resumed during the first braking period that follows the return of the brake parts to normal temperature. Yet it would undoubtedly be preferable to insure the adjustment of the slack at all temperatures.

This is the problem solved by the present invention. To this end, said invention is characterized by the arrangement of the thermostat in such a manner as to automatically add to the length of slack necessary to bring the slack-adjusting mechanism into action a variable increment dependent on the temperature of the brake parts.

This fundamental characteristic may be incorporated in several embodiments which differ according to the type of slack-adjusting means adopted.

1. In such systems comprising a pawl-and-ratchet combination, the thermostat is set so as to cause, or to allow, an initial displacement of the pivot pin of the pawl, or of the plane of the ratchet, which displacement is thus automatically added to the total displacement of the brake shoes necessary to bring the slack-adjusting mechanism into action.

2. In such systems based on the use of a frictionally-movable stop member, such as, for example, a pivoted double-pronged forked member, or its equivalent, the thermostat is so disposed as to vary the spacing between the two branches of said forked member.

Further details and advantages of the invention will appear to one skilled in the art from the following description and the accompanying drawings, in which:

Fig. 3 is a diagrammatic sketch illustrating the method of operation of the thermostat-compensated slack-adjusting mechanism;

Fig. 4 is a side-view in cross-section of said mechanism along line IV—IV of Fig. 3;

Fig. 5 is a side view of the heat-collecting device for the thermostat;

Fig. 6 is a detail view of a second embodiment of the invention combined with a slack-adjusting device based on a frictionally-movable stop member;

Fig. 7 is an enlarged view of the second embodiment;

Fig. 8 is a sectional side view relating to Fig. 7.

Figure 1:
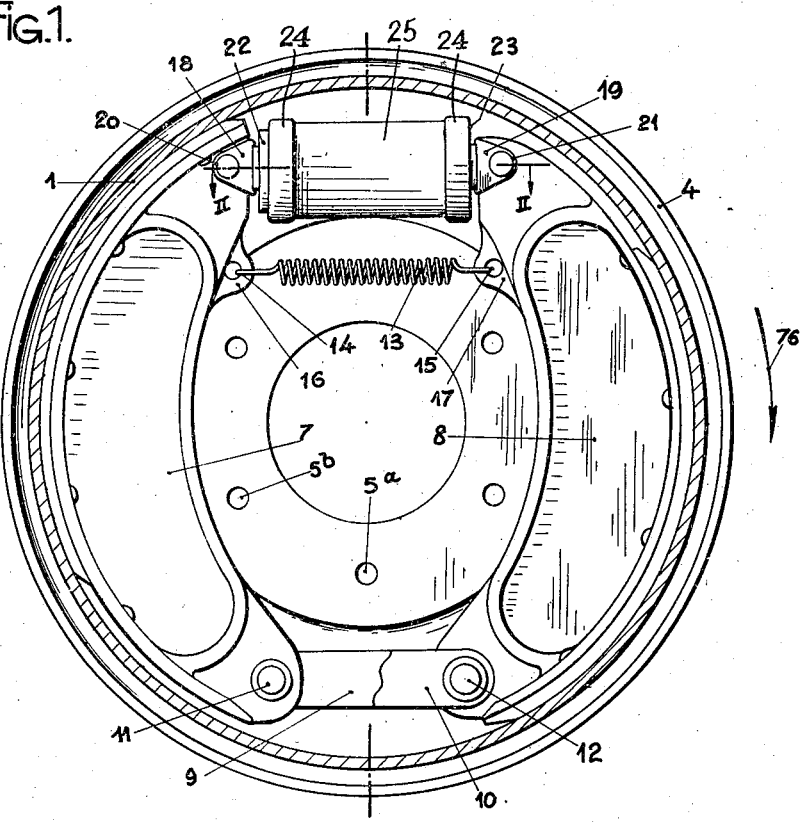
Fig. 1 is a cross-section in elevation through a brake drum.

In the embodiment illustrated in Figs. 1 to 5 inclusive, the brake shown is an hydraulically-operated drum-type expansion brake of the type commonly used on automotive vehicles; but it is emphasized that the invention may be applied to other uses.

In the preferred form illustrated in the above-mentioned figures, the brake drum 1 is designed to be rigidly fixed to a wheel by any appropriate means not shown in the drawings. 4 is the fixed cheek member or coverplate commonly used on motor vehicles, which fulfils the double purpose of serving as support for the brake shoes, the expanding mechanism and other stationary brake parts, and as a cover plate enclosing the drum, for the purpose of preventing mud or other extraneous matter from penetrating among the brake parts. The means of fixation of said cheek member or cover plate have also been omitted, for the sake of simplicity, only the bolt holes 5a, 5b, etc. being shown.

The invention is applicable, regardless of the particular type of braking means used to apply pressure to drum 1. In the example illustrated, said braking means consist of two expansible brake shoes 7 and 8 connected together by links 9 and 10, which are respectively pivoted at 11 and 12 to the lower ends of brake shoes 7 and 8. At the upper end of said shoes, a helical spring, or its equivalent, 13, attached through holes 14 and 15 to lugs 16 and 17, tends to draw said brake shoes 7 and 8 together. Brake shoes 7 and 8 are each provided with bearing members 18 and 19 of hardened steel or other suitable material, attached to the brake shoes by any appropriate means, such as, for example, rivets 20 and 21. Through the action of helical spring 13, said bearing members 18 and 19 are respectively maintained in continuous contact with plungers 22 and 23 of the operating mechanism 24. In their relative positions, the working faces of plungers 22 and 23 against which press the bearing members 18 and 19, are plane surfaces, and plungers 22 and 23 are guided along axes perpendicular to said working faces, hence parallel to links 9 and 10. Consequently, all the forces applied to the brake shoes 7 and 8 by the operating mechanism 24, by links 9 and 10 and by the braking torque, are constant in direction and parallel to each other.

Figure 2:
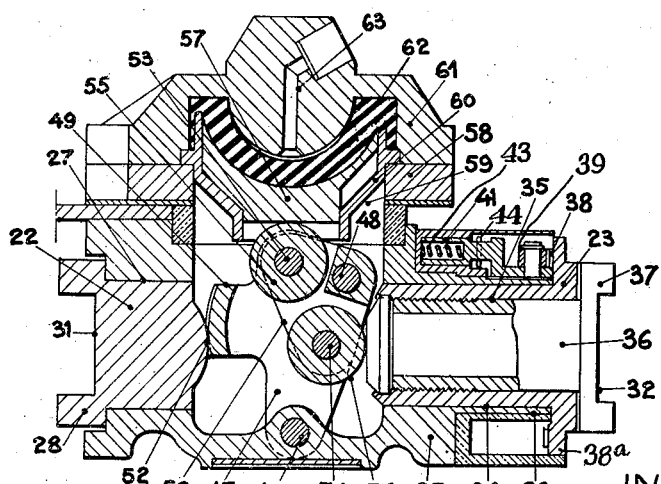
Fig. 2 is a large-scale plane cross-section through the operating mechanism on line II—II of Fig. 1.

The operating mechanism 24 which is illustrated in detail in Fig. 2, in one of its preferred forms, comprises a cylinder 25 which is rigidly attached to the fixed cheek member or cover plate 4, inside the drum 1. Said cylinder 25 is bored cylindrically at 26 and 27 along two parallel axes. Plunger 23 fits slidingly into bore 26, and plunger 22 likewise into bore 27. Plunger 22 is provided with a head 28 of larger diameter, for the purpose of limiting its axial displacement inwards, while plunger 23 is limited in its axial displacement inwards by a collar 38a, which bears against the lip 29 formed by cylinder 25. Plungers 22 and 23 are therefore guided coaxially in a fixed direction. Their working faces 31 and 32 are perpendicular to this motion, and the operating cylinder 25 is fixed to the cover plate 4 in such a position as to be parallel to links 9 and 10.

Plunger 23 fulfils an important function in the slack-adjusting mechanism. It constitutes a variable-length spacing member inserted between the operating mechanism and the brake shoes, so that, by varying the length of said spacing member, the slack in the brake shoes may be varied at will.

To this end, plunger 23 is drilled concentrically at 35, said hole being tapped to accommodate the threaded portion of a rotatable spacing plunger 36. On the other hand, the working face of plunger 36 is provided with two projecting parallel ribs 37 leaving between them a slot or keyway 32 into which fits slidingly bearing member 19 or brake shoe 8. Hence, plunger 36 is permanently restricted in its motion to straight axial translation, and cannot revolve around its own axis. From the foregoing, it is clear that, by rotating plunger 23, plunger 36 which cannot revolve will be moved outwards or inwards, and brake shoes 7 and 8 will thereby be moved correspondingly closer or further from the surface of drum 1.

In order to render such adjustment automatic, it must be tied up with the amplitude of displacement of the brake shoes 7 and 8 during the braking period, in such a manner that, when said amplitude becomes excessive, the length of the spacing member will automatically be increased. In the particular embodiment described, this end is attained by the following means, it being understood, however, that the same result could be reached by other similar means which fall within the scope of this invention.

Plunger 23 comprises at 38a a collar on the inner face of which are cut a series of ratchet teeth 38 which appear more clearly in Fig. 3. Said ratchet teeth co-operate with a pawl 39 which is maintained in contact with the face of said teeth 38 by an elastic member 39a. The pivot pin 40 of said pawl 39 is borne by a supporting member 41, which fits slidingly into a hole or recess 42 bored axially into the wall of cylinder 25. A helical spring 43, or its equivalent, acts on supporting member 41 to force it out of its recess 42 and axially towards collar 38a and ratchet teeth 38 on plunger 23. Said supporting member 41 is so shaped as to bear on collar 38a inside the ring of ratchet teeth under the pressure of spring 43.

On the other hand, the tendency of said supporting member 41 to follow, under the action of spring 43, the axial displacement of plunger 23 is counteracted by an elastic strip 44 which co-operates with supporting member 41 to check the latter's displacement out of recess 42. Said elastic strip 44 is rigidly fixed to the wall of cylinder 25 at 44a, and is subjected to the action of a thermostat 45, the expansible body of which is for instance of a mass of vulcanized rubber.

The above constitutes the temperature-compensated slack-adjusting mechanism, the operation of which will be described hereinafter.

In the interior of cylinder 25 is pivoted at 46 a lever 47 which carries at 48 a pin upon which is pivoted a bent lever 50. Lever 47 also comprises a rounded projecting abutment portion 49, which contacts with the inner face of plunger 22 at 52. Lever 50 carries at 53 and 54 pivot pins for rollers 55 and 56, roller 56 bearing on the inner face of plunger 23, while roller 55 bears on a plunger 57 which will be described hereinbelow.

The above-described operating device is also known from previous disclosures.

Outside the fixed cheek member or cover plate 4 is fixed a support 58 which is bored at 59 to accommodate a sleeve member 60. A cup-shaped cap member 61 fits over support 58 and sleeve member 60 with sufficient clearance to firmly clamp the edge of a thick hemispherical rubber diaphragm 62. Cap member 61 is perforated at 63 for the purpose of applying hydraulic pressure inside it from any appropriate source which need not be described herein. The use of an extensible rubber diaphragm such as 62 is also already known. Under the action of the hydraulic pressure applied through orifice 63, said diaphragm 62 is distended and displaces plunger 57 inwards against roller 55.

The operation of this device is as follows:

Let it be supposed that the brake drum rotates in a clockwise direction, as shown by arrow 76, Fig. 1, and that hydraulic pressure is applied through orifice 63, thus distending diaphragm 62 and displacing plunger 57. Said plunger 57 thrusts against roller 55, which tends to revolve lever 50 around pin 48.

The angular displacement of said lever 50 can produce two separate actions. Let us suppose that plunger 22 remains stationary, which will be shown below to be the correct assumption when the rotation of the drum is clockwise. Triangle 52—48—46, which has two fixed vertices at 52 and 46, necessarily has its 3rd vertex, 48, also stationary. Lever 47 therefore remains stationary. Point 48 being fixed, the rotation of lever 50 transmits a thrust against plunger 23, which in turn pushes plunger 36, since the screw-thread is irreversible. Plunger 36 then pushes bearing member 19 and brake shoe 8, which last moves outwards and presses against the inner surface of the brake drum 1. Said brake shoe 8 is entrained by friction by said brake drum 1, and transmits this force through links 9 and 10 to brake shoe 7. Said brake shoe 7 then presses against plunger 22, tending to push same inside cylinder 25. This motion is prevented by the head 28, so that the combined effect of the reaction of plunger 22 against brake shoe 7 and of the thrust of links 9 and 10 is to intensify the pressure of said brake shoe 7 against the inner face of the drum 1. This effect is the well-known action of the self-applying friction brake, and need not be further described herein.

Normally, when the brake is applied, the amplitude of the displacement of plunger 23 should not exceed a maximum equal to the amount necessary to disengage pawl 39 from the ratchet tooth 38 that it happens to be engaging. Under these conditions, and when the brake parts are cold, the thermostat 45 is contracted, and elastic strip 44 blocks supporting member 41 in its recess 42, and thus keeps pivot pin 40 of pawl 39 stationary. Therefore, as plunger 23 moves, the tip of pawl 39 remains in contact with the sloping rear face of ratchet tooth 38, and travels up said face towards the tip of the tooth. However, if the slack exceeds the height of a tooth, pawl 39 slips off the tip of said tooth 38 under the action of spring 39a and comes in contact with the rear face of the next tooth; and when the brake is released and plunger 23 returns to its initial position, pawl 39 butts up against the forward or working face of the tooth 38 which it has just left, and forces plunger 23 to rotate through a small angle with respect to plunger 36, thus unscrewing the latter with respect to the former; and forcing brake shoe 8 outwards nearer to the braking surface of drum 1. The slack has thus been reduced.

When the brake drum 1 revolves in the opposite direction, that is, anti-clockwise, plunger 23 becomes stationary. Therefore pivot pin 54 is also stationary, and the pressure of plunger 57 on roller 55 forces plunger 22 outwards. If the brake is on an automotive vehicle, this condition obtains when the vehicle is moving backwards. The operation of the brake is identical to the preceding case, with the exception that plunger 22 is now the expanding agent, and that, in this case, the slack-adjusting mechanism is inoperative.

It is quite clear from the foregoing that the slack-adjusting mechanism would function in the same manner, whether the slack was due to temporary heat expansion or to permanent wear, if the pivot 40 of pawl 39 were to remain stationary. Now in the first case, the subsequent cooling of the brake drum will cause the latter to tighten down on the brake shoes, which would tend to block the wheels, unless the ratchet teeth 38 are made of considerable height. But in this case, the initial setting of the slack will be excessive and the brake operation will be defective.

In order to correct this defect, the pivot pin 40 of pawl 39 is made movable instead of stationary.

When the brake is cold, thermostat 45 is contracted, and the elastic strip 44 lies against the wall of cylinder 25. Therefore supporting member 41 of pawl 39 is locked by said strip 44 in its recess 42, and the slack-adjusting mechanism functions as described above.

On the contrary, when the temperature rises and thermostat 45 expands, elastic strip 44 is deflected by said thermostat. It therefore ceases to lock supporting member 41 in its recess. Hence, when plunger 23 is displaced by the operating mechanism of the brake, said member 41 remains pressed against the inner face of 23 by the action of its spring 43, and said member 41 and pivot pin 40 follow the motion of plunger 23. Since there is no relative motion between pawl 39 and teeth 38, the slack-adjusting mechanism will remain idle. However, when the supporting member 41, in following plunger 23, encounters elastic strip 44 in its partly deflected state, the motion of the former is arrested; and, from this point on, pivot pin 40 will remain stationary, and pawl 39 will act as described above.

From the foregoing, it is seen that the slack-adjusting device remains continually in service, regardless of the temperature of the brake parts; but the maximum value of the slack above which said slack-adjusting mechanism comes into action to take up the excess slack is composed of the sum of two components: one which is constant and equal to the height of a ratchet tooth; and another which is variable and a function of the temperature of the brake parts regulated by the thermostat.

In order that the thermostat may follow closely the temperature fluctuations in the drum 1, the preferred arrangement illustrated in Fig. 5 may optionally be adopted. According to this improvement, a heat collector 45a is used to collect heat from said drum 1 and convey it to the thermostat. Said heat collector consists of a stationary shoe of considerable surface area set as close as possible to said drum 1, in order to receive the heat radiated by said drum 1. It is claimed that, under these conditions, the temperature of said heat collector 45a follows sufficiently closely that of the drum 1 to make sure that the expansion of the thermostat will practically be a direct function of the temperature of the drum.

Figs. 6 and 7 illustrate a variant of the invention as applied to hydraulic-type brakes in which the hydraulic pressure line is connected, during every off-period of the brake, with a compensating pressure tank which insures the filling of said pressure line after each application of the brake. The brake illustrated is also equipped with a slack-adjusting mechanism of a different type to the former, of which the following is a description.

The brake shoe 89 bears a pin 90 which is engaged between the two fingers 91 and 92 of a forked member 93, which forked member is frictionally pivoted on the coverplate at 94; the value of said frictional resistance being determined accurately by certain considerations which will be exposed below. For obtaining this frictional resistance, the forked member 93, mounted on the pivot 94, is resiliently pressed against a flange 94a of this pivot, by a resilient washer 99 and a nut 98 screwed on the screw threaded portion 94b of the pivot 94. The clearance between pin 90 and the two fingers 91 and 92 of forked member 93 corresponds to the initial permissible slack. If, during a braking period, the displacement of brake shoe 89 exceeds the allowed maximum, forked member 93 is displaced around its friction pin 94. When the brake is released, pin 90 in returning, comes in contact with finger 91, which serves as a specie of abutment and checks the return stroke of said brake shoe. To this end, the frictional resistance of the pivot pin 94 is adjusted so that the torque necessary to overcome said friction and to force said forked member 93 to revolve around its pivot pin is substantially greater than the torque exerted by spring 13 to return brake shoe 89 to its initial position. Under these circumstances, the braking torque, being many times greater than the frictional torque of forked member 93, will have no trouble in forcing said forked member forward when the slack is too great; but spring 13 will be unable to swing 93 back from its new position. Hence the initial "off" position of the brake will be altered and the excess slack taken up. Furthermore, the compensating pressure tank which is automatically connected with the hydraulic feed line when the brake is released instantly delivers to said feed line a quantity of liquid corresponding to that required to move the brake shoe 89 to its new "off" position. Therefore the slack has been automatically taken up.

In order to adapt the present invention to the problem of compensating the above-described slack-adjusting device for all fluctuations in the temperature of the brake parts, a thermostat 95 is incorporated in forked member 93, as shown in Fig. 7, in such a manner as to increase the spacing between fingers 91 and 92 as fast as the temperature rises. To this end, one of said fingers, 92, is movable and fits slidingly into a hole in which is located the thermostat 95 filled with an expansible material 96 such as vulcanized rubber. A spring 97 forces finger 92 to return to its initial position as soon as the thermostat contracts.

It is clear from the foregoing that the spacing between fingers 91 and 92, which determines the allowable displacement of brake shoe 89 before the slack-adjusting mechanism comes into play, is composed of a constant quantity plus a variable increment substantially proportional to the rise in the temperature of the brake parts.

It should be borne in mind that the above-described embodiments of the invention represent only two solutions of the same, and that many other solutions exist which fall within the scope of the claims; also that the invention is applicable to other types of machinery comprising parts possessing relative alternating motion.

What I claim is:

1. An automatic heat-compensated slack-adjusting device comprising, in combination, a pawl and a ratchet respectively borne by machine parts possessing relative alternating motion and co-acting to reduce the slack between said machine parts as soon as it exceeds a certain limit and means for displacing the pivot of said pawl by an amount substantially proportional to the rise in temperature of said machine parts above normal, thus increasing the value of said slack limit by an increment dependent on said temperature.

2. An automatic heat-compensated slack-adjusting device comprising, in combination, a rotatable pawl, a movable supporting member for said pawl slidingly fitted into one of said machine parts, elastic means tending to move said supporting member in conjunction with another of said machine parts possessing alternating relative motion with respect to said first machine part, a movable stop member tending to check the motion of said supporting member, a thermostat operated by the temperature of said machine parts and operating said movable stop member to vary the amount of travel of said supporting member according to the temperature of said machine parts, a ratchet co-acting with said pawl to reduce the slack as soon as it exceeds a given constant value over and above the travel of said supporting member of said pawl.

3. In a brake, an automatic adjusting device comprising a movement transmitting member, a receiving member and a connecting member between the transmitting member and the receiving member, means providing pivotal connection of said connecting member to at least one of the two other members, means whereby the rotation of the connecting member modifies the spacing between the transmitting member and the receiving member, a ratchet connection comprising two parts, the first part being a ratchet wheel and the second part being a spring pressed pawl engaging said ratchet wheel, means for connecting one of the said two parts to the connecting member, a movable supporting member for the other of said two parts, resilient means tending to move said supporting means against the part connected to the connecting member, a movable stop member tending to check the motion of said supporting member, a thermostat operated by the temperature of the brake and acting on said stop member to vary the amount of movement of said supporting member according to said temperature.

4. In a brake, a drum, friction means adapted to engage with the drum, means for expanding said friction means, comprising a movement transmitting member, a receiving member, and a connecting member between the transmitting member and the receiving member, means providing pivotal connection of said connecting member to at least one of the two other members, means whereby the rotation of the connecting member modifies the spacing between the transmitting member and the receiving member, a ratchet connection comprising two parts, the first part being a ratchet wheel and the second part being a spring-pressed pawl engaging with said ratchet wheel, means for connecting one of the said two parts to the connecting member, a movable supporting member for the other of said two parts, resilient means tending to move said supporting means against the part connected to the connecting member, a movable stop member tending to check the motion of said supporting member, a thermostat operated by the temperature of the brake and acting on said stop member to vary the amount of travel of said supporting member according to said temperature.

5. In a brake, a drum, friction means for engaging with the drum, means for expanding said friction means and comprising a movement transmitting member, a receiving member, and a connecting member between the transmitting member and the receiving member, means providing pivotal connection of said connecting member to at least one of the two other members, means whereby the rotation of the connecting member modifies the spacing between the transmitting member and the receiving member, a ratchet wheel, a spring-pressed pawl engaging with said ratchet wheel, a movable supporting member for said pawl, resilient means tending to move said supporting member against said ratchet wheel, a movable stop member tending to check the motion of said supporting member, a thermostat operated by the temperature of the brake and acting on said stop member to vary the amount of travel of said supporting member according to said temperature.

6. In a brake, a drum, friction means adapted to engage with the drum, means for expanding said friction means and comprising a movement transmitting member, a receiving member, and a connecting member between the transmitting member and the receiving member, means providing pivotal connection of said connecting member to at least one of the two other members for pivoting about a geometrical axis parallel to the direction of expansion, means whereby the rotation of the connecting member modifies the spacing between the transmitting member and the receiving member, a ratchet wheel, a spring-pressed pawl engaging with said ratchet wheel, a movable supporting member for said pawl, resilient means tending to move said supporting member against said ratchet wheel, a movable stop member tending to check the motion of said supporting member, a thermostat operated by the temperature of the brake and acting on said stop member to vary the amount of travel of said supporting member according to said temperature.

7. In a brake, a drum, friction means for engaging the drum, means for expanding said friction means, comprising a movement transmitting member, a receiving member, and a connecting member between the transmitting member and the receiving member, means providing pivotal connection of said connecting member to at least one of the two other members for pivoting about a geometrical axis parallel to the direction of expansion, means whereby the rotation of the connecting member modifies the spacing between the transmitting member and the receiving member, a ratchet connection comprising two parts, the first part being a plane disc having ratchet teeth arranged with its geometrical axis coinciding with the first named axis, and the second part being a spring-pressed pawl engaging one of said teeth, a movable supporting member for said pawl, resilient means tending to move said supporting member against said plane disc, a movable stop member tending to check the motion of said supporting member, a thermostat operated by the temperature of the brake and acting on said stop member to vary the amount of travel of said supporting member according to said temperature.

8. In a brake, a drum, friction means for engaging the drum, and an automatic adjusting device for the friction means to compensate for wear, including an operating pawl, a movable supporting member for said pawl, a ratchet wheel, resilient means tending to move said supporting means against the ratchet wheel, a movable stop member for said supporting means, and means operated by the temperature of the brake for moving said stop member.

9. In a brake, a drum, friction means for engaging the drum, and an automatic adjusting device for the friction means to compensate for wear, including an operating pawl, a movable supporting member for said pawl, a ratchet wheel, resilient means tending to move said supporting means against the ratchet wheel, a movable stop member for said supporting means, means operated by the temperature of the brake for moving said stop member, and a mass of metal arranged as near as possible to the drum for conducting the heat of said drum towards said means.

LOUIS CHARLES BRISSON.